United States Patent [19]

Buechner et al.

[11] 4,169,929

[45] Oct. 2, 1979

[54] MANUFACTURE OF LOW DENSITY ETHYLENE POLYMERS OF IMPROVED HOMOGENEITY

[75] Inventors: Oskar Buechner, Dudenhofen; Volker Gierth, Ludwigshafen, both of Fed. Rep. of Germany

[73] Assignee: BASF Aktiengesellschaft, Fed. Rep. of Germany

[21] Appl. No.: 902,285

[22] Filed: May 3, 1978

[30] Foreign Application Priority Data

May 16, 1977 [DE] Fed. Rep. of Germany ....... 2722034

[51] Int. Cl.² .................... C08F 10/02; C08F 110/02; C08F 6/28
[52] U.S. Cl. .................... 526/352.2; 526/59; 526/921; 528/501; 528/502
[58] Field of Search .................... 526/59, 921, 352.2; 528/501, 502

[56] References Cited

U.S. PATENT DOCUMENTS

| | | | |
|---|---|---|---|
| 2,852,501 | 9/1958 | Richard, Jr. et al. | 526/921 |
| 3,117,953 | 1/1964 | Goebel et al. | 528/502 |
| 3,294,773 | 12/1966 | Gans et al. | 526/921 |
| 3,714,123 | 1/1973 | Mancini et al. | 526/352.2 |
| 3,784,538 | 1/1974 | Pfannmueller et al. | 526/921 |
| 3,956,256 | 5/1976 | Mercx | 526/352.2 |

*Primary Examiner*—Alan Holler
*Attorney, Agent, or Firm*—Keil & Witherspoon

[57] ABSTRACT

A process for the continuous high pressure polymerization of ethylene in a polymerization system which comprises a polymerization zone (A), a high pressure product isolation zone (B), a throttling and control system (C), a low pressure product isolation zone (D), a second throttling and control system (E) and a discharge extruder (F), and wherein, according to the invention, the level of the ethylene polymer in the high pressure product isolation zone (B) and in the low pressure product isolation zone (D) is varied periodically. The process gives an ethylene polymer of improved homogeneity, which when used to manufacture films does not tend to form specks or fisheyes.

6 Claims, No Drawings

MANUFACTURE OF LOW DENSITY ETHYLENE POLYMERS OF IMPROVED HOMOGENEITY

The present invention relates to a process for the continuous manufacture of high pressure ethylene polymers.

In this process, the ethylene polymers are obtained by homopolymerizing ethylene or by copolymerizing ethylene with one or more compounds copolymerizable therewith, in a polymerization system (A) under a pressure of from 500 to 5,000 bars and at from 50° to 450° C. in the presence of a free radical polymerization initiator, and transferring the resulting reaction mixture into a high pressure product isolation zone (B), which is under a pressure of from 100 to 500 bars and at from 150° to 400° C., thence through a throttling and control system (C) into a downstream low pressure product isolation zone (D), which is under a pressure of from 1 to 10 bars and at from 150° to 400° C., and thence through a second throttling and control system (E) into a discharge extruder (F), the level of the molten ethylene polymer in (B) and (D) being set to a constant normal level by selection of the orifice cross-section of the system (C) or (E) downstream from (B) and (D) respectively, and/or the level in (D) being set to a constant normal level by selecting the speed of the screw of the extruder (F).

In such processes, measures are required in order to obtain a particular constant level of the molten ethylene polymer, obtained as the reaction product, in the high pressure product isolation zone (B), also referred to as the high pressure product separator, and in the low pressure product isolation zone (D), also referred to as the low pressure product separator. This prevents the unconverted ethylene, which, for example, is separated in the low pressure product isolation zone (D) from the ethylene polymer obtained, from being discharged into the atmosphere via the extruder (F). In this way it is possible to recycle the separated-off ethylene to the polymerization system (A).

Three methods have been disclosed for conforming to these requirements, i.e. for ensuring a constant level of the ethylene polymer melt in the low pressure product separator (D). In the first method, the speed of the screw of the discharge extruder (F) is matched to the stream of ethylene polymer melt coming from the polymerization system (A) to give a level of, preferably, 50±5 scale divisions, referred to in the present invention as the constant normal level. To control the level in the separators (B) and (D), the conventional method using a source of γ-radiation preferably the nuclide $^{60}$Co, is employed. Counter tubes specifically suitable for γ-rays are used as the radiation detectors. The principle and the technique of measurement are known and are described, for example, by L. Herforth and H. Koch in "Radiophysikalisches und radiochemisches Grundpraktikum," Berlin: VEB Deutscher Verlag der Wissenschaften (=Hochschulbucher der Physik, Volume 31), 1959, XIV, 17th group. Amongst the possible ways of arranging the radiation sources and the detectors, listed in this book, a method is selected in which the mass absorption observed with oblique passage of the radiation is measured in the bottom part of the separator. The level can be followed on an indicator scale with 100 divisions. Position O is set by zero suppression. It is the position at which no further polymerization melt can be discharged by the extruder. Position 100 is selected so that at this level adequate separation of resulting ethylene polymer from unreacted ethylene is still possible. Position 50±5 is treated as the normal level.

The second method for obtaining a constant normal level of the polymer melt in the low pressure product separator (D) comprises adjusting the free feed cross-section of the downstream throttling and control system (E). This control system (E) is inserted between the low pressure product separator (D) and the intake orifice of the discharge extruder (F). The throttling and control device (E) is preferably a conventional ballcock or a single-faced valve. Its maximum orifice corresponds to the pipe cross-section in the feed of the extruder (F). The throttling and control system can be adjusted manually or automatically. In the latter case, the desired scale reading of 50±5 is used as a pulse generator for a control circuit which acts either on the extruder speed setting or on the orifice of the throttling or shutoff device. Such measuring and control devices have been disclosed. Of course, the use of an extruder (F) which discharges at a rate matching the stream of polymer melt produced, does not preclude the additional insertion of the device (E) upstream from the extruder intake.

A constant level of the polymer melt in the low pressure product separator (D) can also be maintained, apart from using the above methods, by keeping constant the level in the upstream high pressure product separator (B) by means of the throttling and control system (C), which differs from the system (E) in that components, e.g. valves, which can be operated at the higher pressures prevailing in (B) are employed, and regulating the flow of melt leaving the low pressure product separator (D), either by means of the system (E) and/or by means of the speed of the screw of the extruder (F), so that it corresponds to the flow of melt leaving the high pressure product separator.

However, it is found when manufacturing ethylene polymers by the above conventional high pressure polymerization process that inhomogeneities, i.e. specks, fisheyes, gels and the like, occur spontaneously when manufacturing films from the material which has first been converted to granules. It has been disclosed that such inhomogeneities in the final product can be excluded or substantially reduced if the material is aftertreated before being delivered to the film manufacturer. In this aftertreatment, the granules obtained after extrusion of the polymer melt are—to mention some of the possible prior art methods—either passed over calendering rolls whilst near their melting range and then again extruded, or processed on single-screw or twin-screw machines where the screw comprises kneading and homogenizing sections, or fed to an internal mexer which is upstream from a continuously running extruder. These methods are both involved and expensive.

It is an object of the present invention to provide a process for the manufacture of low density ethylene polymers which gives products where the occurrence of inhomogeneities can be substantially reduced or avoided, without requiring expensive aftertreatments.

We have found that this object is achieved by a method wherein, at recurring intervals, the level of the molten ethylene polymer in the high pressure product isolation zone (B) and in the low pressure product isolation zone (D) is periodically lowered relative to the normal level and again raised to the normal level, or is raised and then lowered, by periodically opening and narrowing the orifice cross-section of the throttling and control system (C) downstream from (B), or the level in (D) is similarly varied by periodically changing the orifice cross-section of the throttling and control system (E) or by periodically changing the speed of the screw of the extruder (F).

Preferably, the intervals between the end of one lowering and raising, or raising and lowering, of the level in (B) and (D), or in (D), and the start of the next change in level, are from 30 to 240 minutes.

In a preferred process, the duration of each lowering and raising of the level in (B) and (D), or in (D), is from 3 to 20 minutes. The degree of lowering and raising of the level in (B) and (D), or in (D), should preferably in each case be from 50 to 100%, preferably from 50 to 80%, of the constant normal level.

According to advantageous embodiments of the process of the present invention, the periodic lowering and raising of the level in the low pressure product isolation zone (D) is effected either by periodically releasing and narrowing the orifice cross-section of the throttling and control system (F), at a matching speed of the screw of the extruder (F) and with a constant orifice cross-section of the throttling and control system (C), or by periodically varying the speed of the screw of the extruder (F), with a constant orifice cross-section of the system (C) and with the system (E) completely opened.

According to another preferred process, the periodic lowering and raising of the level in the product isolation zones (B) and (D) is effected by periodically releasing and narrowing the orifice cross-section of the throttling and control system (C) with a constant orifice of the system (E) and at a constant speed of the screw of the extruder (F).

The process, described at the outset, for the continuous manufacture of ethylene polymers by the high pressure process and the stepwise isolation of the polymer after leaving the polymerization system (A), in isolation zones or separators (B) and (D), before it is fed to an extruder (F) and then converted to granules, is known and is described, for example, in "Chemical Engineering" 73 (1966) (26), 113–120 and in "Ullmanns Encyklopadie der technischen Chemie", Verlag Urban & Schwarzenberg, Munich and Berlin, 3rd edition (1963), Volume 14, 138–145. The process is applicable to all of the conventional continuously operated high pressure polymerization systems, for example to continuously operated tubular reactors and/or stirred autoclaves. Tubular reactors means tubular polymerization vessels of which the length is from 5,000 to 50,000 times the diameter of the circular tube.

The process is applicable to the homopolymerization of ethylene and to the copolymerization of ethylene with one or more other compounds copolymerizable therewith. These latter compounds can be any which can conventionally be copolymerized under high pressure conditions in the presence of the conventional free radical polymerization initiators. Examples of such compounds are acrylic acid and its esters with alcohols of 1 to 4 carbon atoms, acylonitrile, acrylamide, vinyl acetate, vinyl propionate and vinyl ethers. The term ethylene polymers means, in the present context, solid polymers having melt indices in the range from 0.08 to 40 g/10 min (DIN 53,735). Any polymerization initiators, with or without chain transfer agents, conventionally used for homopolymerizing or copolymerizing ethylene can be employed for the high pressure polymerization. Where the product is an ethylene homopolymer, it has a density of from 0.915 to 0.935 g/cm$^3$ (DIN 53,479).

To isolate the polymers formed, the reaction mixture leaving the polymerization zone (A) and consisting of the polymer formed and the unconverted monomers is let down to a pressure of from 100 to 500 bars and fed into one or more parallel high pressure product isolation zones (B), where the greater part of the polymer formed is separated out as a melt. The material which has been separated out in the high pressure product isolation zone (B) passes through a throttling and control system (C) into one or more downstream low pressure product isolation zones (D). In these, residual polymer can be substantially separated from the volatile constituents. The temperatures in (B) and (D) are set to from 150° to 400° C. The mean product residence time is generally from 0.5 to 60 minutes in (B) and (D). The pressure is from 100 to 500 bars in (B) and from 1 to 10 bars in (D). Before the polymer melt enters the discharge extruder (F), it passes through a second throttling or control system (E) which is downstream from the low pressure product isolation zone (D).

The level of the separated-out, molten polymer in the high pressure product isolation zone (B) and in the low pressure product isolation zone (D) is usually kept at a constant level. Such a constant normal level is achieved in (B) by setting the throttling and control system (C) to a suitable orifice cross-section. In the low pressure product isolation zone (D), the normal level can be kept constant in the conventional manner either by selecting a suitable orifice cross-section of the throttling and control system (E) or, if the system (E) is completely open, by selection of the speed of the screw of the extruder (F).

Using the process of the invention, the level of the molten ethylene polymer in the high pressure product isolation zone (B) and in the low pressure product isolation zone (D), or in the latter zone only, is, at recurring intervals, periodically lowered from the normal level and again raised to the normal level, or raised and then lowered. For this purpose, a throttling and control device (C) is attached to the outlet downstream from the high pressure product isolation zone (B). By periodically releasing and narrowing the orifice cross-section of the system (C), the level of the molten polymer in the high pressure product isolation zone and at the same time in the low pressure product isolation zone is periodically raised and lowered, or lowered and then raised. According to the invention, the function of the control system (C) is periodically to raise and lower, or lower and raise, the level in the product zones (B) and (D).

It frequently suffices, for the process according to the invention, periodically to raise and lower, or lower and raise, the level of the molten polymer, relative to the normal level defined initially, only in the low pressure product isolation zone (D), in which the product has a mean residence time of from 0.5 to 60 minutes at from 150° to 400° C. For this purpose, either the control system (E) located at the outlet downstream from the low pressure product isolation zone (D) is periodically opened and narrowed, or the speed of the screw of the extruder (F) is varied periodically. The critical requirement is that the lowering and raising of the level in (D) or in (B) and (D) should be repeated periodically, preferably at definite time intervals. This measure avoids the formation of dead spaces in (B) and/or (D), in which a certain proportion of the polymer which has been separated off has a relatively long residence time at the relatively high temperature of from 150° to 400° C.

The time interval between the end of one lowering and raising, or raising and lowering, of the level in (B) and (D), or in (D), and the start of the next change of level in (B) and (D), or in (D), is generally from 30 to 240, preferably from 45 to 120, minutes. In the interim, the molten ethylene polymer in the separators (B) and (D) is set to the normal level. The duration of lowering and raising of the level in the separators (B) and (D), or (D) alone, is generally in each case from 3 to 20, preferably from 5 to 12, minutes. The duration of lowering and raising of the level here means the time in minutes over which one lowering and raising is effected, i.e. over which, for example, the orifice cross-section of the control system (C) or (E) has been released and again narrowed. The amount by which the level in the separators (B) and (D), or in the separator (D), is lowered and raised in generally from 50 to 100%, preferably from 60 to 80%, of the normal level.

The periodic lowering and raising of the level in the low pressure separator (D) can be effected either by periodically releasing and narrowing the orifice cross-section of the control system (E), at a matching speed of the screw of the extruder (F) and with a constant orifice cross-section of the control system (C), or by periodically varying the speed of the screw of the extruder (F), with the control system (E) completely open and with a constant orifice cross-section of the system (C). Matching the speed of the screw of the extruder means altering the speed of the extruder, when releasing or narrowing the orifice cross-section of the system (E), by the amount of from 50 to 150% of the speed which is required in order to be able continuously to discharge the product formed in the polymerization system (A).

Releasing the orifice cross-section means completely opening the throttling and system (C) or (E). When the orifice cross-section is narrowed, the throttling and control system (C) or (E) is only partially open. This measure of varying the orifice cross-section periodically speeds up or slows down the flow of melt from the separator (B) into the separator (D) or from the separator (D) into the extruder (F). The periodic speeding up or slowing down of the flow of melt from the separator (D) can also be achieved by periodically varying the speed of the discharge extruder (F), with the orifice cross-section of the system (E) remaining constant.

It is an advantage of the process according to the invention that the method described results in a more homogeneous ethylene polymer which, when converted to films, does not tend to form specks or fisheyes.

The Examples which follow illustrate the method used.

In the Examples the homogeneity was assessed as follows: Using an extruder with an L:D ratio of 20, 40 μm thick films were produced using a blow-up ratio of 1:2 and a material temperature of 150° C. in front of the screw tip. The homogeneity of the films obtained is assessed visually, the films being examined for fisheyes, specks or gels. It has proved advantageous to hold the samples to be assessed at a distance of a few centimeters in front of a grid consisting of 1.5 cm wide black stripes glued at intervals of 1.5 cm onto an illuminated frosted glass plate.

Unless stated otherwise, the samples used to prepare the test films were from a total amount of 50 tonnes and one sample was taken every 5 tonnes during production. Accordingly, groups of 10 films were available for assessment.

The polymers were classified according to melt index and density in accordance with DIN 53,735 and DIN 53,479, respectively.

EXAMPLE 1

A tubular reactor is used to produce 5,000 kg/h of polyethylene having a melt index of 4 g/10 min and a density of 0.924 g/cm$^3$. The level in the low pressure product separator (D) is kept to 50±5 divisions of the indicator scale, using a control circuit, by adjusting the orifice width of a flat slide valve (E) which is located between the separator (D) and the intake of the extruder (F). The control circuit comes into action every 60 minutes so as to reduce the orifice cross-section to 75% of the mean value in the control position. After 6 minutes, the indicator reaches a scale reading of 100 (output measurements give a value of 4,600 kg/h). When this value has been reached, the adjustment cylinder of the slide valve moves by the same amount which it was previously moved from the control position in the direction of 75% orifice cross-section, but in the opposite direction relative to the control position. After 4.5 minutes (when the output is 5,500 kg/h), a scale reading of 50 is reached. Thereafter, the slide valve momentarily opens completely and thereafter reverts to the control position corresponding to a level of 50 scale divisions.

The test films 1–10 show no major inhomogeneities and only a few minor, just detectable inhomogeneities which are distributed at random, i.e. without any recognizable aggregation, over the film sample.

COMPARATIVE EXPERIMENT

Exactly the same procedure as above was followed, with the sole exception that the raising and lowering of the level of the melt in the separator (D) and the complete opening of the slide valve were omitted. The film sample 6 shows an aggregation of major inhomogeneities at two points of the tubular film sample (which is about 10 m long), but in other respects the appearance of the film corresponds to Example 1.

The results of further experiments can be summarized in the finding that following the procedure of Example 1 none of the samples shows inhomogeneities whilst when following the procedure of the Comparative Experiment at least one out of 10 samples does so.

EXAMPLE 2

A tubular reactor is used to produce 180 kg/h of a copolymer having a density of 0.9295 g/cm$^3$ and a melt index of 10.6 g/10 min. The copolymer contains, in addition to ethylene, 5.6% by weight of acrylic acid and 2.54% by weight of tert.-butyl acrylate as copolymerized units. The level in the low pressure product separator (D) is set to 50 scale divisions by manual adjustment. In practice, this means that the level fluctuates between values of from 40 to 60 scale divisions. The stream of melt is throttled every 60 minutes in such a way that a level of 100 scale divisions is reached after from 3 to 6 minutes. After reaching this value, the slide valve (E) is moved in the "open" direction away from the "normal position", by the same amount which it had previously been moved in the "closed" direction away from the "normal position". After an average of 4 minutes, the melt level reaches 50 scale divisions. The slide valve (E) is then opened completely and immediately thereafter the level to 50 scale divisions is restored.

The amount of material examined was 1/10 of the usual amount (i.e. 5 tonnes were examined, with a sample taken every 500 kg). The films showed more inhomogeneities than when using the method of Example 1, but again the inhomogeneities were minor and showed a random distribution.

COMPARATIVE EXPERIMENT

The conditions of Example 2 were modified so as constantly to seek to keep the melt level at 50 scale divisions. Aggregations of sizable specks were now encountered in film samples 3 and 6. Repeats showed that there were no specks when following the procedure described in Example 2.

EXAMPLE 3

The reactor, a stirred autoclave, produces 850 kg/h of an ethylene copolymer which contains 13% by weight of vinyl acetate as copolymerized units and has a melt index of 4.2 g/10 min and a density of 0.933 g/cm$^3$. The level of the melt in the low pressure product separator (D) is varied in the same way as described in Example 1. Depending on the measure taken, the output drops to about 760 kg/h (and the level rises) or the output rises to about 910 kg/h (and the level drops again). The homogeneity of the test films is comparable with those from Example 1.

COMPARATIVE EXPERIMENT

The procedure described in Example 1 is followed, except that the melt is set to a constant level. In contrast to Example 3, sizable specks are found in films 7 and 8. Repeats confirm the result of Example 3. Under the conditions of the Comparative Experiment, 1 or 2 out of 10 test films show a plurality of sizable specks.

EXAMPLE 4

The polymerization system (A), a tubular reactor, produces 1,700 kg/h of polyethylene having a melt index of 2 g/10 min and a density of 0.923 g/cm$^3$. The level in the low pressure product separator (D) is kept constant at 50±5 scale divisions, via a control circuit, by varying the speed of the extruder. The flat slide valve (E) is completely open. To cope with the amount of polymer produced, the average speed of the extruder (F) has to be 95 rpm. Every 45 minutes the speed is brought to a fixed value of 70 rpm. After 4 minutes, the level in the separator (D) reaches 100 scale divisions. The speed is then altered to 110 rpm. After a further 4.5 minutes, the level is 50 scale divisions, and is then again kept constant automatically at 50±5 scale divisions by varying the speed of the extruder.

The test films 1–10 do not show any sizable inhomogeneities, but only a few small, just detectable inhomogeneities which are distributed at random over the surfaces of the film, without any detectable aggregation.

COMPARATIVE EXPERIMENT

The procedure followed was exactly as above, with the sole exception that the level in the low pressure product separator (D) was continuously kept constant at 50±5 scale divisions by automatically regulating the extruder speed. Aggregations of inhomogeneities were found in film sample 4. On repeating the test, 1 or 2 out of 10 film samples showed such inhomogeneities.

EXAMPLE 5

The working conditions were as described in Example 4, i.e. the level in the low pressure product separator (D) was kept at 50±5 scale divisions by varying the speed of the extruder (F). However, differing from the above Example, the speed was brought to a fixed average value of 95 rpm every 60 minutes. At the same time, the level of the melt in the low pressure product separator (D) was brought to 80 scale divisions by opening the control system (C), downstream from the high pressure product isolation zone (B), twice as wide as its orifice in the control position. The maximum melt level was reached after 3 minutes. The system (C) was then gradually brought back, in the course of 4 minutes, to the orifice width which it had in the control position. The level control system by varying the speed of the extruder (F) was then brought into play and finally the level in the low pressure product separator (D) was 50±5 scale divisions.

No inhomogeneities were found in test films 1–10. The normal condition, i.e. extrusion without varying the level in the low pressure product separator (D), has already been described in the Comparative Experiment accompanying Example 4.

We claim:

1. A process for the continuous manufacture of an ethylene polymer by homopolymerizing ethylene, or by copolymerizing ethylene with one or more compounds copolymerizable therewith, in a polymerization system (A) under a pressure of from 500 to 5,000 bars and at from 50° to 450° C. in the presence of a free radical polymerization initiator, and transferring the resulting reaction mixture into a high-pressure product isolation zone (B), which is under a pressure of from 100 to 500 bars and at from 150° to 400° C., thence through a throttling and control system (C) into a downstream low-pressure product isolation zone (D), which is under a pressure of from 1 to 10 bars and at from 150° to 400° C., and thence through a second throttling and control system (E) into a discharge extruder (F), the level of the molten ethylene polymer in (B) and (D) being set to a constant normal level by selection of the orifice cross-section of the system (C) or (E) downstream from (B) and (D) respectively, and/or the level in (D) being set to a constant normal level by selecting the speed of the screw of the extruder (F), wherein the level in (B) and (D) is periodically lowered relative to the normal level and again raised to the normal level, or is raised and then lowered, by periodically releasing and narrowing the orifice cross-section of the system (C) downstream from (B), or the level in (D) is similarly varied by periodically changing the orifice cross-section of system (E) or by periodically changing the speed of the screw of the extruder (F), the lowering and raising of the level in (B) and (D), or in (D), is in each case by from 50 to 100% of the normal level and the interval between the end of one lowering and raising, or raising and lowering, of the level (B) and (D), or in (D), and the start of the next change in level is at least about 30 minutes.

2. A process as set forth in claim 1, wherein the intervals between the end of one lowering and raising, or raising and lowering, of the level in (B) and (D), or in (D), and the start of the next change in level, are from 30 to 240 minutes.

3. A process as set forth in claim 1, wherein the duration of a lowering and raising of the level in (B) and (D), or in (D), is from 3 to 20 minutes.

4. A process as set forth in claim 1, wherein the periodic lowering and raising of the level in (D) is effected by periodically releasing and narrowing the orifice cross-section of the system (E), at a matching speed of the screw of the extruder (F), and with a constant orifice cross-section of the system (C).

5. A process as set forth in claim 1, wherein the periodic lowering and raising of the level in (D) is effected with the system (E) completely opened, and with a constant orifice cross-section of the system (C), by periodically varying the speed of the screw of the extruder (F).

6. A process as set forth in claim 1, wherein the periodic lowering and raising of the level in (B) and (D) is effected by periodically releasing and narrowing the orifice cross-section of the system (C) with a constant orifice of the system (E), and at a constant speed of the screw of the extruder (F).

* * * * *